US009273520B2

(12) United States Patent
O'Blenes

(10) Patent No.: US 9,273,520 B2
(45) Date of Patent: Mar. 1, 2016

(54) CONTROL LINE SECUREMENT METHOD AND SYSTEM

(71) Applicant: TESCO CORPORATION, Houston, TX (US)

(72) Inventor: Jonathan Brian O'Blenes, Calgary (CA)

(73) Assignee: TESCO CORPORATION, Houston, TX (US)

( * ) Notice: Subject to any disclaimer, the term of this patent is extended or adjusted under 35 U.S.C. 154(b) by 473 days.

(21) Appl. No.: 13/706,125

(22) Filed: Dec. 5, 2012

(65) Prior Publication Data

US 2013/0168107 A1 Jul. 4, 2013

Related U.S. Application Data

(60) Provisional application No. 61/581,258, filed on Dec. 29, 2011.

(51) Int. Cl.
| | |
|---|---|
| *E21B 17/02* | (2006.01) |
| *E21B 19/22* | (2006.01) |
| *E21B 17/10* | (2006.01) |

(52) U.S. Cl.
CPC ............ *E21B 17/026* (2013.01); *E21B 17/023* (2013.01); *E21B 17/1035* (2013.01); *E21B 19/22* (2013.01)

(58) Field of Classification Search
CPC . E21B 17/023; E21B 17/026; E21B 17/1035; E21B 17/10; E21B 17/1042; E21B 19/22; E21B 19/20; E21B 19/008
See application file for complete search history.

(56) References Cited

U.S. PATENT DOCUMENTS

| | | | | |
|---|---|---|---|---|
| 6,131,664 | A * | 10/2000 | Sonnier ......................... | 166/381 |
| 6,782,932 | B1 | 8/2004 | Reynolds, Jr. et al. | |
| 2008/0093086 | A1 | 4/2008 | Courville et al. | |
| 2009/0272780 | A1* | 11/2009 | Crawford ......................... | 226/4 |
| 2012/0240527 | A1* | 9/2012 | Herron ............................ | 53/461 |

FOREIGN PATENT DOCUMENTS

| | | |
|---|---|---|
| GB | 2345708 | 7/2000 |
| WO | WO2011015856 | * 2/2011 |

OTHER PUBLICATIONS

PCT International Search Report & Written Opinion for International Application No. PCT/US2012/068532 mailed Jan. 21, 2014.
"Wrapping silage," YouTube user PHETR, accessed Apr. 7, 2011; http://www.youtube.com/watch?v=W0uYPrkUm8Y&feature=related.

(Continued)

*Primary Examiner* — David Bagnell
*Assistant Examiner* — Tara Schimpf
(74) *Attorney, Agent, or Firm* — Fletcher Yoder, P.C.

(57) ABSTRACT

Control lines are secured to a completion string by a wrap wound around the completion string and control lines. The control lines are positioned adjacent to the completion string as it is lowered towards a well, and the wrap is wound helically around the lines and string in an open or closed loop manner. The placement and pitch of the wrap may be regulated, such as based upon the rate of advancement of the string into the well. One or multiple wraps may be used, and successive turns of the one or more wraps may overlap or be spaced from one another.

17 Claims, 3 Drawing Sheets

(56) References Cited

OTHER PUBLICATIONS

"CMB band it-60-express.avi," YouTube user KELWOODMACHINERY, accessed Apr. 7, 2011; http://www.youtube.com/watch?v=TOifrM21xsg&feature=related.

"New Spiral Machine," YouTube user VPMACHINES, accessed Apr. 7, 2011; http://www.youtube.com/watch?v=VswUJv6h_e4&NR=1.

"New Braiding Machine 3 over 3," YouTube user VPMACHINES, accessed Apr. 7, 2011; http://www.youtube.com/watch?v=y6_OspMZzEU.

* cited by examiner

CONTROL LINE SECUREMENT METHOD AND SYSTEM

This application claims priority from and the benefit of U.S. Provisional Application Ser. No. 61/581,258, entitled "Control Line Securement Method and System," filed Dec. 29, 2011, which is hereby incorporated by reference for all purposes.

BACKGROUND

The invention relates generally to the field of well completions, and more particularly to techniques for providing and securing control lines to completion or production strings during deployment in a well.

Following drilling of oil and gas wells, completion strings are typically placed and cemented into a well for production of fluids from one or more production horizons from which they are raised to the Earth's surface for further processing. In many cases small tubing lines and conduits, electrical wiring and other conductors are associated with the completion string to perform various operations, such as sensing downhole parameters, opening and closing valves, permitting closing in of the well, injection of various chemicals, and so forth. Such lines, conduits and conductors are commonly referred to as "control lines", and one or many may be provided with any particular well.

There are a number of methods known for deploying control lines with tubes and piping lowered into wells. For example, various clamps may be placed over the control lines and at least a part of the piping to anchor the control lines to the outside of the piping. "Slips", "spiders" or some other support device is sometimes used to hole the piping during attachment of the control lines. In one particular arrangement that has proven particularly useful, clamps or straps are applied fasten the control lines to the piping in a space between a rig floor and an entry to the well.

There still exists a need for further refinement in techniques for attachment of control lines to completion strings that may offer alternatives and advantages over known approaches. There is a particular need for techniques that may reduce or eliminate the need for clamps and bands, and reduce the need for operations personnel to place or monitor placement of such devices.

BRIEF DESCRIPTION

The present invention is designed to respond to such needs. In accordance with one aspect of the invention, a method for securing a control line to a tubular string for placement in a well includes lowering the string towards the well, placing the control line adjacent to an outer surface of the string, and winding a wrap helically around the string and control line to secure the control line between the wrap and the outer surface of the string.

The invention also provides a system securing a control line to a tubular string for placement in a well. The system includes a structure for holding and lowering the string towards the well, at least one store of control line to be secured to the string, and a winding station disposed downstream of a location where the control line approaches the string and configured to winding a wrap helically around the string and the control line to secure the control line between the wrap and an outer surface of the string.

Still further, the invention provides a tubular well string comprising a tubular string disposed in a well, a control line disposed adjacent to an outer surface of the string, and a wrap wound helically around the string and the control line to secure the control line to the string.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present invention provides novel control line securement systems and methods that can be used in any type of oil or gas well. The techniques allow for securement of one or multiple control lines, and these may include any desired tubing, conduit, wiring, conductors, and so forth. The techniques may allow for securement to the completion string as it is placed into the well with little or no stoppage for securement of the lines. Moreover, the techniques may be employed with limited modification of known support structures used for clamping or banding control lines to well piping.

Figure 1:
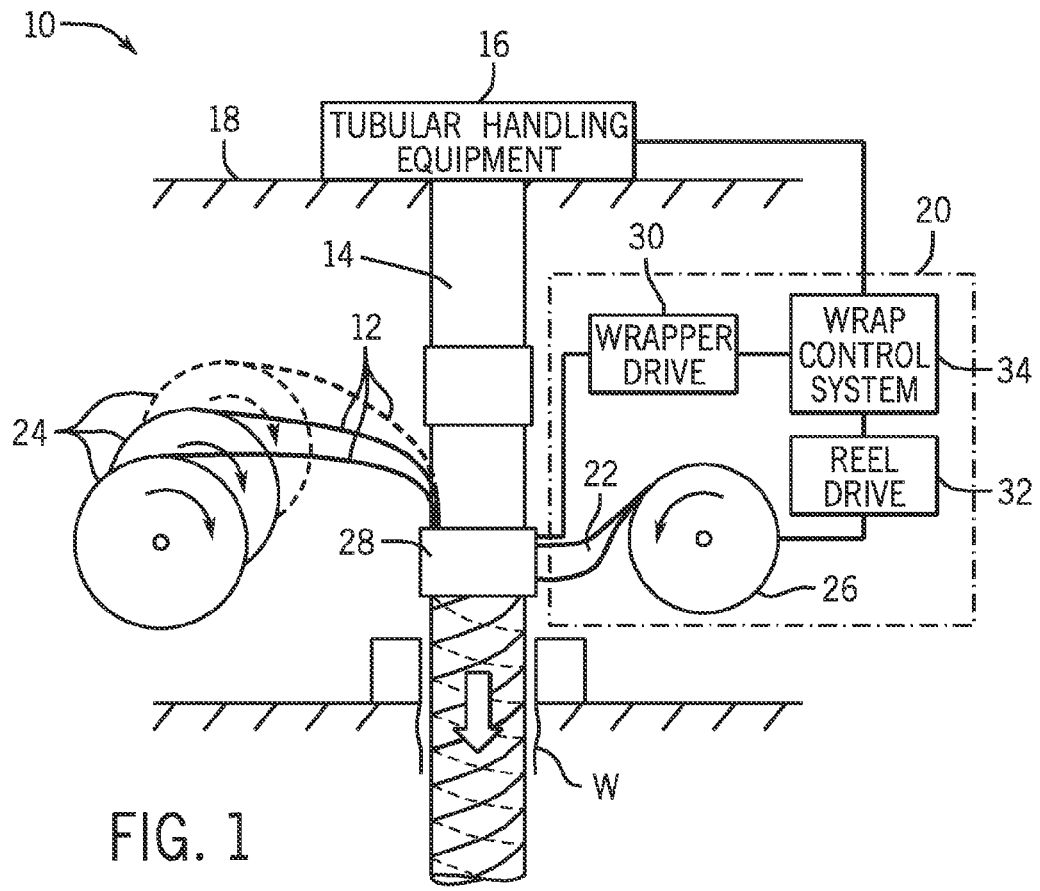
FIG. 1 is a diagrammatical illustration of a completion string being placed in a well, with control lines being attached to the string in accordance with the present techniques.

FIG. 1 is a diagrammatical view of an exemplary well during placement of a completion string and control lines. A control line securement system, designated generally by reference numeral 10, is designed to place and secure control lines 12 adjacent to a completion string 14. The control lines may comprise any range of conventional conduits, wiring, cabling, and so forth for various purposes, such as control of subterranean equipment and components, sampling of fluids, injection of fluids, detection of well parameters, and so forth. The system 10 allows for placement of multiple control lines, or as few as a single control line.

The completion string 14 will be assembled and lowered by tubular handling equipment 16 in a conventional manner. The details of the handling equipment are beyond the scope of the present disclosure and may conform to generally known on- or off-shore systems. In general, the tubular handling equipment 16 will be positioned above a table or platform 18, with a winding station 20 disposed between the table or platform and an entrance to a well, indicated generally by the symbol W. The winding station 20 allows a wrap 22 to be disposed around the control lines and completion string as the completion string is lowered into the well. As described more fully below, parameters of the placement of the wrap, including its location, pitch, and so forth, as well as the location of the control lines may be controlled during this process. In the illustrated embodiment, the control lines 12 are stored on reels 24 that may be unwound to pay out the control lines during their placement. Equipment designed for this purpose may be generally conventional in nature, such as that disclosed in U.S. Pat. No. 6,131,664 entitled "System, Apparatus, and Method for Installing Control Lines in a Well", issued to Sonnier on Oct. 17, 2000, which is hereby incorporated into the present disclosure by reference.

The wrap 22 may also be stored on a reel 26 which may be controlled to pay out the wrap as it is wound around the completion string and the control lines. A wrapper 28 may be disposed at least partially around the completion string to wind the wrap helically around the completion string and control lines as they are advanced into the well. In certain embodiments, this component or other components of the winding station may also rotate around the completion string as it is lowered into the well. The wrapper 28 allows the wrap 22 to be paid out at a desired rate, which may be performed in an open-loop or closed-loop manner, as described below. In general, the wrapper 28 will be associated with a wrapper drive 30 which may be a motorized device that draws the wrap 22 from the reel 26 and winds it tightly around the completion string and control lines. A reel drive 32 may be associated with reel 26 to control the pay out and tension on the wrap. Tension may also be applied by other mechanisms generally known in the art. A wrap control system 34 is coupled to the wrapper drive 30 and to the reel drive 32, and controls operation of these devices to wind the wrap around the completion string and control lines as desired. The wrap control system 34 may also be coupled to the tubular handling equipment 16 so as to coordinate winding of the wrap with advancement of the completion string into the well.

Figure 2:
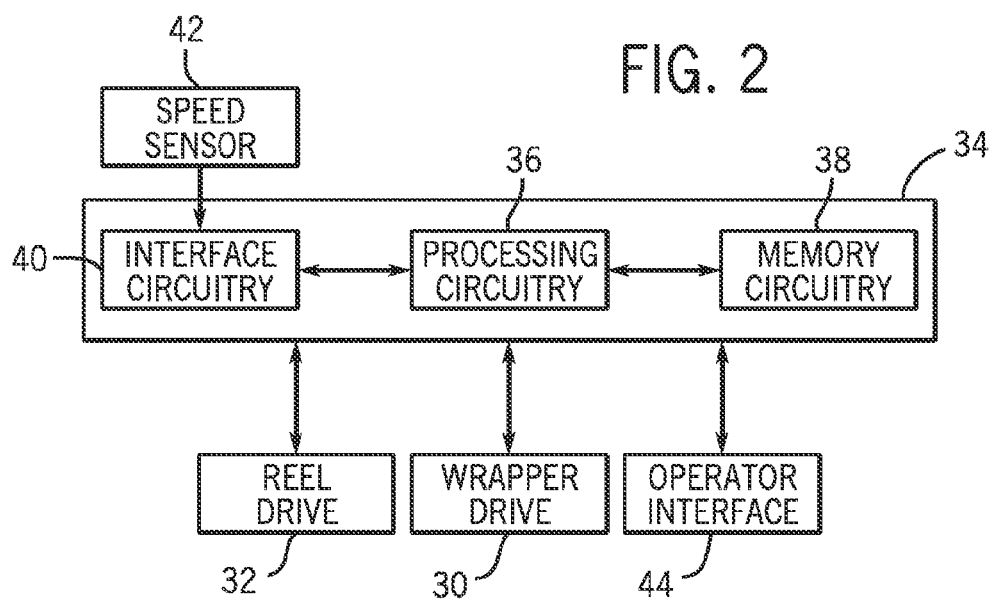
FIG. 2 is a diagrammatical illustration of an exemplary wrapping system for securement of the control lines to the completion string.

FIG. 2 is a diagrammatical illustration of certain of the functional components that may be found in the system of FIG. 1. The wrap control system 34, for example, will typically include processing circuitry 36 adapted to execute instructions stored on memory circuitry 38 for winding the wrap around the completion string and control lines. The memory circuitry 38 may also store parameters utilized by the processing circuitry during wrap control, such as tensions, speeds, pitches of the wrap, and so forth. Interface circuitry 40 may be provided in the system and adapted to exchange signals with external components, such as a speed sensor 42. In the illustrated embodiment, speed sensor 42 may be associated with the tubular handling equipment 16 to provide a signal indicative of the rate of advancement of the completion string into the well. Based upon this signal, the processing circuitry 36 may regulate operation of the wrapper drive 30 and the reel drive 32 to control the winding of the wrap in a closed-loop manner. Finally, the system will typically include an operator interface 44 that allows an operator to initiate wrapping, control wrapping, monitor wrapping, and so forth. In certain embodiments, the operator interface may be provided locally at the winding station 20, or remotely, such as in a control room where other completion operations are monitored and controlled.

Figure 3:
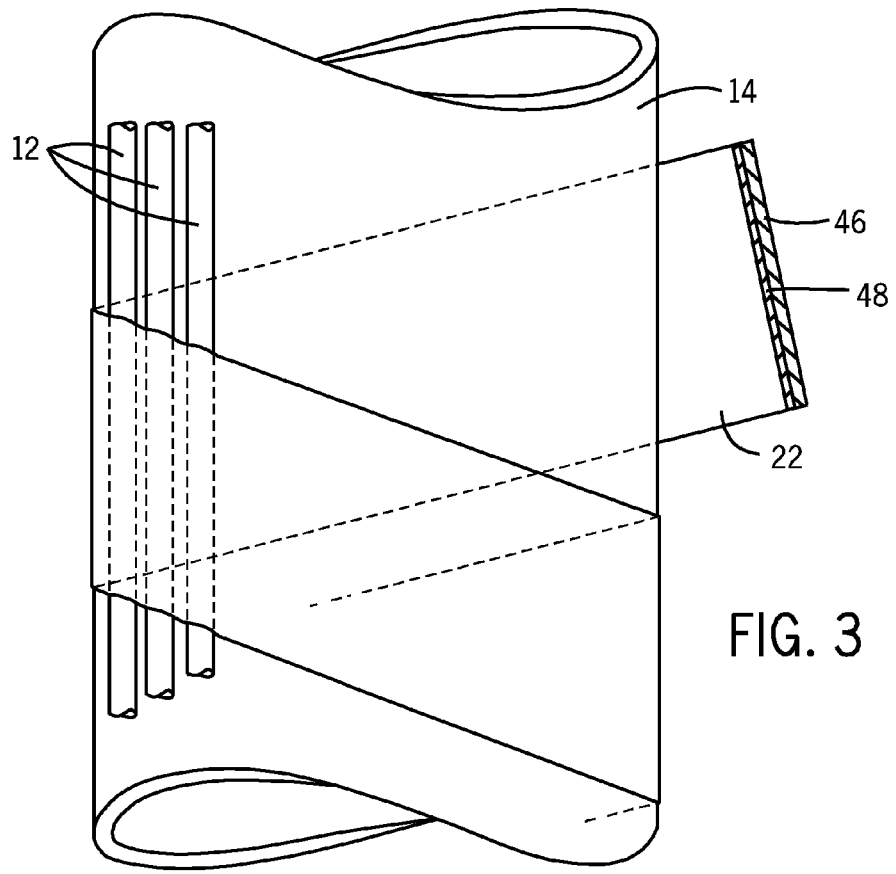
FIG. 3 is an elevational view of a portion of the completion string with the control lines secured to the outer surface by a wrap.

FIG. 3 is an elevational diagram of a portion of a completion string 14 with control lines 12 secured to an outer surface of the completion string by a wrap 22 in accordance with the present disclosure. In general, the control lines 12 may be positioned adjacent to one another, or they may be spaced around the completion string, including on different sides of the completion string. They may be located directly in contact with an outer service of the completion string 14, or in certain cases intermediate materials or layers may be placed between the control lines and the outer surface of the completion string. In both cases, for the present purposes the control lines are considered to be adjacent to the completion string. The wrap 22 is the helically wound around the completion string and control lines as illustrated. In a presently contemplated embodiment, the wrap 22 may comprise a substrate 46 with an adhesive layer 48 provided on an inner surface thereof. The substrate may be made of any suitable material, as may be the adhesive layer, but these are preferably materials that are compatible with the fluids, temperatures, chemical compositions, and so forth present within the well. By way of example only, the substrate 46 may be made of various synthetic plastic materials (e.g., polymers), web-like materials, woven materials, and so forth.

Figure 4:
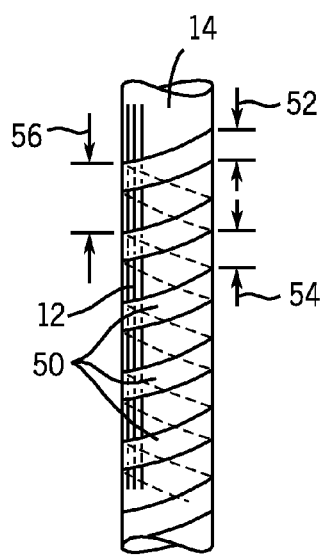
FIG. 4 is a similar elevational view illustrating certain of the wrapping parameters that may be considered and controlled in the control line placement.
Figure 5:
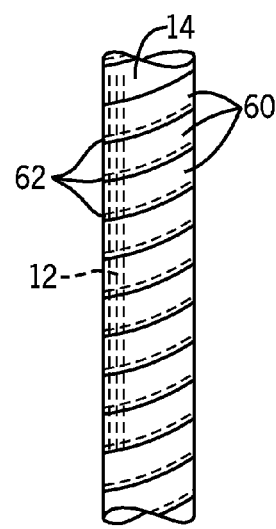
FIG. 5 is another elevational view of a wrapped completion string and control lines showing possible overlap of wraps.

FIGS. 4 and 5 illustrate two examples of how the wrap may be wound around the completion string and control lines. For example, as illustrated in FIG. 4, the wrap may comprise successive turns 50, each having a width 52 and a spacing 54 between each turn. The width 52 and spacing 54 combine to establish a pitch 56 for the wrap. This pitch may be constant, and controlled to remain constant along the length of the completion string, although in certain applications the pitch may be varied (e.g., near joints in the string). It should also be noted that the width 52 and spacing 54 defining the pitch may be selected to provide the desired holding force of the control lines next to the completion string, and to avoid unnecessarily extended lengths of control line that are not adequately bound to the completion string. At the same time, in many cases the pitch will be selected to reduce the amount of wrap needed on the completion string to that required for holding the control lines, thereby reducing cost and effort in the winding process. It should also be noted that while a single wrap is illustrated in FIG. 4, in practice two or more separate wraps may be provided, such as wraps wound in alternating turns on the completion string. In certain other embodiments more than one wrap may be provided, and these may be wound in opposite helical directions on the completion string.

FIG. 5 illustrates a possible wrap winding in which overlapped turns 60 are disposed around the completion string to completely cover the completion string and the control lines. In this embodiment, the amount of overlap 62 between successive turns may be controlled during the wrapping process. Moreover, the embodiment of FIG. 5 may be accomplished with a single wrap or with multiple wraps as mentioned above.

Figure 6:
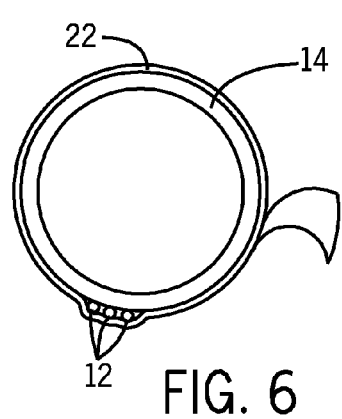
FIG. 6 is a sectional view through a completion string with control lines held by a wound wrap.

FIG. 6 is a sectional view through a portion of a completion string wrapped as described above. The completion string generally comprises a tubular member with a central opening in which various devices may be positioned, and through which minerals of interest may be produced. The wrap 22 is wound helically around the completion string, trapping the control lines in a desired location adjacent to a completion string once wrapped.

Figure 7:
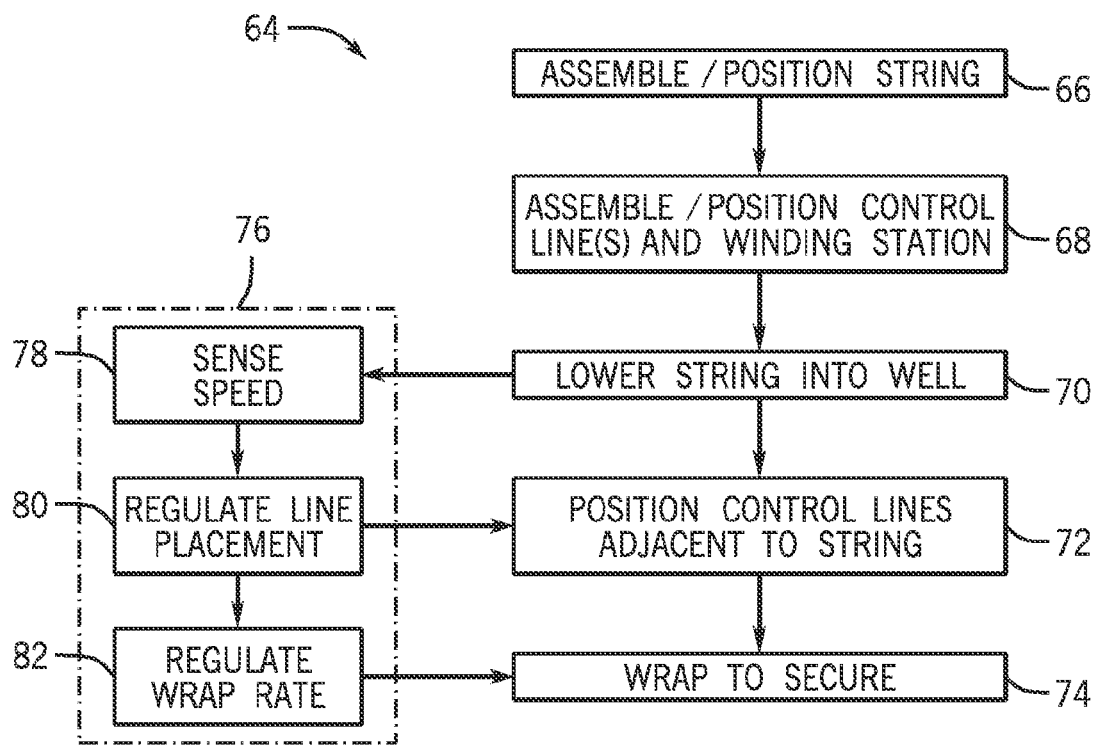
FIG. 7 is a flow chart illustrating exemplary steps in securing control lines to a completion string by wrapping.

FIG. 7 illustrates exemplary steps in a process 64 for securing control lines to a completion string by wrapping. The process will typically be initiated by assembly and positioning of the completion string 66 in a conventional manner. Thus, the completion string may be brought to a platform or table where it is to be lowered into a well, and successive portions of the completion string may be assembled for lowering into the well. At step 68 a control lines and winding station are similarly assembled and positioned adjacent to the completion string as described above. Once the equipment is in place, then, the string will be lowered into the well as indicated by reference numeral 70. Again, this step may be performed in a conventional manner. However, at step 72 with the control lines positioned adjacent to the string, the control lines and string are wrapped as indicated at step 74 to secure the control lines in place at desired locations around and along the completion string. This process continues until the completion is in place with the control lines attached. During the wrapping process, from time to time it may be necessary to begin a new reel of wrapping material when a previous reel is exhausted. This may be performed simply by stopping the lowering of the string into the well, changing the reel of wrap, and securing the new wrap to the completion string, which may be independently secured, or may be spliced to a previous section of wrap.

Certain of the steps in the process may be controlled in closed-loop manner as mentioned above, and as indicated generally be reference numeral 76. For example, as the string is lowered into the well, the speed of advancement may be sensed as indicated at step 78. This speed may be detected by a sensor, or more than one sensor, or may be provided by some component of the tubular handling equipment that regulates the speed of advancement. Based upon this speed, then, the rate of placement of the control line may be regulated as indicated at step 80. That is, the control line placement equipment may be regulated to match the rate of advancement of the completion string into the well. Similarly, then, based upon the speed of advancement of the completion string, the wrap rate may be controlled as indicated at step 82, such as to provide a uniform (or more generally, a controlled) pitch of successive turns wound around the completion string and control lines.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for securing a control line to a tubular string for placement in a wellbore, the method comprising:
    lowering the string into the wellbore;
    placing the control line adjacent to an outer surface of the string;
    winding a wrap helically around the string and control line to secure the control line between the wrap and the outer surface of the string; and
    detecting a rate of movement of the string into the wellbore; and
    executing a closed loop control scheme to regulate and adjust a rate of winding of the wrap around the string and the control line based upon the rate of movement of the string into the wellbore.

2. The method of claim 1, wherein the wrap comprises a generally flat tape-like structure.

3. The method of claim 1, wherein the wrap comprises a material compatible with a chemical environment in the wellbore.

4. The method of claim 1, wherein the wrap comprises an adhesive layer for adhering the wrap to the control line and the string.

5. The method of claim 1, wherein the wrap is continuously wound around the string and the control line as the string is lowered into the wellbore.

6. The method of claim 1, wherein the wrap is wound around the string and the control line in successive wraps that overlap with one another.

7. The method of claim 1, comprising winding at least two wraps helically around the string and the control line.

8. A system securing a control line to a tubular string for placement in a wellbore, the system comprising:
    tubular handling equipment configured to hold and lower the string into the wellbore;
    at least one store of control line to be secured to the string;
    a winding station disposed downstream of a location where the control line approaches the string and configured to wind a wrap helically around the string and the control line to secure the control line between the wrap and an outer surface of the string;
    a sensor for detecting a rate of movement of the string into the wellbore; and
    control circuitry configured to execute a closed loop control scheme to regulate and adjust a rate of winding of the wrap around the string and the control line based upon the rate of movement of the string into the wellbore.

9. The system of claim 8, comprising a table or platform below which the control line is brought into contact with the outer surface of the string, wherein the winding station is disposed between the table or platform and an entry to the wellbore.

10. The system of claim 8, comprising multiple stores of control lines disposed around the string.

11. The system of claim 8, wherein the winding station is configured to wind a plurality of wraps around the string and the control line.

12. The system of claim 8, wherein the winding station is configured to continuously wind the wrap helically around the string and the control line.

13. A tubular well string comprising:
    a tubular string disposed in a wellbore;
    a control line disposed adjacent to an outer surface of the string;
    a wrap wound helically around the string and the control line to secure the control line to the string; and
    control circuitry configured to execute a closed loop control scheme to regulate and adjust a rate of winding of the wrap around the string and the control line based upon a rate of movement of the tubular string into the wellbore.

14. The string of claim 13, comprising a plurality of control lines secured to the string by the wound wrap.

15. The string of claim 13, wherein successive winds of the wrap overlap with one another.

16. The string of claim 13, wherein the wrap comprises a generally flat tape-like structure.

17. The string of claim 13, wherein the wrap comprises an adhesive layer for adhering the wrap to the control line and the string.

* * * * *